US012614335B2

(12) United States Patent (10) Patent No.: US 12,614,335 B2
Pang et al. (45) Date of Patent: Apr. 28, 2026

(54) METHOD AND SYSTEM FOR DISTRIBUTED REAL-TIME RENDERING

(71) Applicant: Huawei Cloud Computing Technologies Co., Ltd., Gui'an New District (CN)

(72) Inventors: Shuo Pang, Montreal (CA); Li Li, Vancouver (CA); Jiehan Zhou, Toronto (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 113 days.

(21) Appl. No.: 18/532,291

(22) Filed: Dec. 7, 2023

(65) Prior Publication Data

US 2025/0191271 A1     Jun. 12, 2025

(51) Int. Cl.
  *G06T 15/00*      (2011.01)
  *G06T 15/50*      (2011.01)
(52) U.S. Cl.
  CPC .......... *G06T 15/005* (2013.01); *G06T 15/506* (2013.01)
(58) Field of Classification Search
  CPC ............................ G06T 15/005; G06T 15/506
  See application file for complete search history.

(56) References Cited

U.S. PATENT DOCUMENTS

| | | | |
|---|---|---|---|
| 2020/0402294 A1* | 12/2020 | Yerli | G06T 15/205 |
| 2022/0028158 A1* | 1/2022 | Stengel | G06T 15/06 |
| 2023/0206955 A1* | 6/2023 | Cole | G11B 27/005 |
| | | | 386/280 |
| 2024/0112391 A1* | 4/2024 | Desai | G09G 5/003 |
| 2024/0212294 A1* | 6/2024 | Potetsianakis | G06T 19/006 |
| 2024/0428522 A1* | 12/2024 | Ying | G06T 15/40 |

* cited by examiner

*Primary Examiner* — Kee M Tung
*Assistant Examiner* — Xiaoming Wei
(74) *Attorney, Agent, or Firm* — Slater Matsil, LLP

(57) ABSTRACT

Distributed real-time rendering is a cutting-edge solution to address the ever-increasing demands for realistic and immersive visual experiences, such as provided by augmented or artificial reality applications. Embodiments of the present specification provide a method and a system for distributed real-time rendering of a scene. The rendering is distributed among a root instance and a plurality of node instances. The root instance receives the scene to render, segments it into a plurality of objects, computes lighting parameters, assigns rendering tasks associated with objects to node instances, and communicates object metadata and the lighting parameters to the assigned node instance. The node instances render objects and create point clouds and u, v maps, which are then used by the root instance to render the scene for real-time display. The method and system can be used by end devices that include position sensors, processors, communication means and a display to provide immersive experiences.

20 Claims, 5 Drawing Sheets

100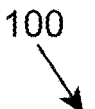

```
┌ ─ ─ ─ ─ ─ ─ ─ ─ ─ ─ ─ ─ ─ ─ ─ ─ ─ ─ ─ ─ ─ ─ ─ ─ ┐  ┌─210
│                                                  │
│  ┌──────────────────────┐   ┌──────────────────────┐
│  │ Receive data and     │- -│ Transmit rendered    │
│  │ determine scene       │   │ scene                │
│  │ 105                   │   │ 160                  │
│  └──────────────────────┘   └──────────────────────┘
│           │                          ▲
│           ▼                          │
│  ┌──────────────────────┐   ┌──────────────────────┐
│  │ Compute workload     │   │ Enforce consistency  │
│  │ 110                  │   │ 155                  │
│  └──────────────────────┘   └──────────────────────┘
│           │                          ▲
│           ▼                          │
│  ┌──────────────────────┐   ┌──────────────────────┐
│  │ Segment scene data   │   │ Cast shadows         │  ┌─260
│  │ 115                  │   │ 150                  │
│  └──────────────────────┘   └──────────────────────┘
│           │                          ▲
│           ▼                          │
│  ┌──────────────────────┐   ┌──────────────────────┐
│  │ Estimate light       │   │ Aggregate            │
│  │ paramaters           │   │ 145                  │
│  │ 120                  │   └──────────────────────┘
│  └──────────────────────┘            ▲
│           │                          │
│           ▼                          │
│  ┌──────────────────────┐   ┌──────────────────────┐
│  │ Assign tasks         │   │ Transmit point cloud │
│  │ 125                  │- -│ and u,v map 140      │
│  └──────────────────────┘   └──────────────────────┘
│           │                          ▲
│           ▼                          │
│  ┌──────────────────────┐            │            ┌─280
│  │ Transmit metadata    │   ┌──────────────────────┐
│  │ and light 130        │   │   Render objects 135 │
│  └──────────────────────┘   └──────────────────────┘
└ ─ ─ ─ ─ ─ ─ ─ ─ ─ ─ ─ ─ ─ ─ ─ ─ ─ ─ ─ ─ ─ ─ ─ ─ ┘
```

FIG. 2

METHOD AND SYSTEM FOR DISTRIBUTED REAL-TIME RENDERING

TECHNICAL FIELD

The technical field relates to rendering, and more specifically to systems and methods for distributed real-time scene rendering.

BACKGROUND

Distributed rendering is common in offline, non-real-time domains. In offline rendering, scene creation is typically performed by a rendering farm. The rendering farm leverages a large number of graphics processing units (GPU) for parallel processing capabilities, and is divided into multiple views of the rendering camera, concurrently computed in the different GPUs according to the scene settings, and finally combined into the same bidimensional rendered scene. The bidimensional renders are played continuously to form an animated film.

Traditional monolithic solutions for graphics rendering use a self-contained system including CPU, GPU, and memory resources that handle all tasks of rendering. While it offers simplicity and ease of development, it suffers from drawbacks such as limited computing capacity, and a lack of flexibility to adapt to large-scale scenarios. This can result in low rendering quality, creating negative user experience, for instance in the gaming and broader virtual experience contexts. In particular, achieving lighting consistency in rendering contributes to realism but involves complex algorithms and techniques that require major computational resources.

SUMMARY

The requirements for realistic rendering and simulation are endless. Currently, GPUs cannot fully meet the requirements of realistic rendering in real time. There exists, therefore, a need for an improved method for realistic rendering in real time. Distributed real-time rendering is a cutting-edge solution to address the ever-increasing demands for realistic and immersive visual experiences, such as provided by augmented or artificial reality applications.

In accordance with an aspect, the present specification provides embodiments of a method for distributed real-time rendering of a scene. The rendering is performed in a root instance and in a plurality of node instances. The root instance receives the scene to render, segments the scene into a plurality of objects, each of the plurality of objects associated with object metadata, and computes lighting parameters associated with the scene. Advantageously, to allow for parallel, distributed rendering, the root instance assigns to each node instance one or more rendering task, each rendering task being associated with one or more of the objects and, with respect to each rendering task, communicates to the node the object metadata associated with the object(s) of its assigned rendering task and the lighting parameters. Then, each node instance uses the object metadata and the lighting parameters to render its assigned object(s) into at least a point cloud, and sends the point cloud to the root instance. The root instance is finally able to render a rendered scene from the point clouds, making real-time display possible.

In accordance with another aspect, the present specification provides embodiments of a system for distributed real-time rendering of a scene. The system includes a root instance and a plurality of node instances. The root instance includes a segmentation module, a lighting module, an assignment module, and an aggregation module. Each of the plurality of node instances includes a communication link with the root instance and a rendering module. The segmentation module is configured to segment the scene into a plurality of objects, each of the plurality of objects being associated with object metadata. The lighting module is configured to compute lighting parameters associated with the scene. The assignment module is configured to assign to each node instance one or more rendering tasks, each rendering task being associated with one or more of the plurality of objects, which makes distributed rendering possible. The rendering module is configured to render the object into at least a point cloud based on the object metadata and on the lighting parameters. The communication link is configured to receive object metadata associated with a rendering task and the lighting parameters, and to send the point cloud to the root instance. The aggregation module is configured to use the point clouds to render a rendered scene including the plurality of objects, making real-time display possible.

As an example, embodiments of the method and/or the system just described can be used to render scenes for an immersive application of an end device. Position data can be obtained from at least one positioning sensor of the end device and provided as input to the immersive application. This allows the immersive application to generate scene data based on the position data. The end device can then transmit the scene data to the root instance for distributed real-time rendering. Once the scene is rendered, the rendered scene is received and displayed on a display of the end device.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment.

FIG. 2 is a flowchart of a method for distributed real-time rendering of a scene in accordance with an embodiment.

DETAILED DESCRIPTION

Figure 1:
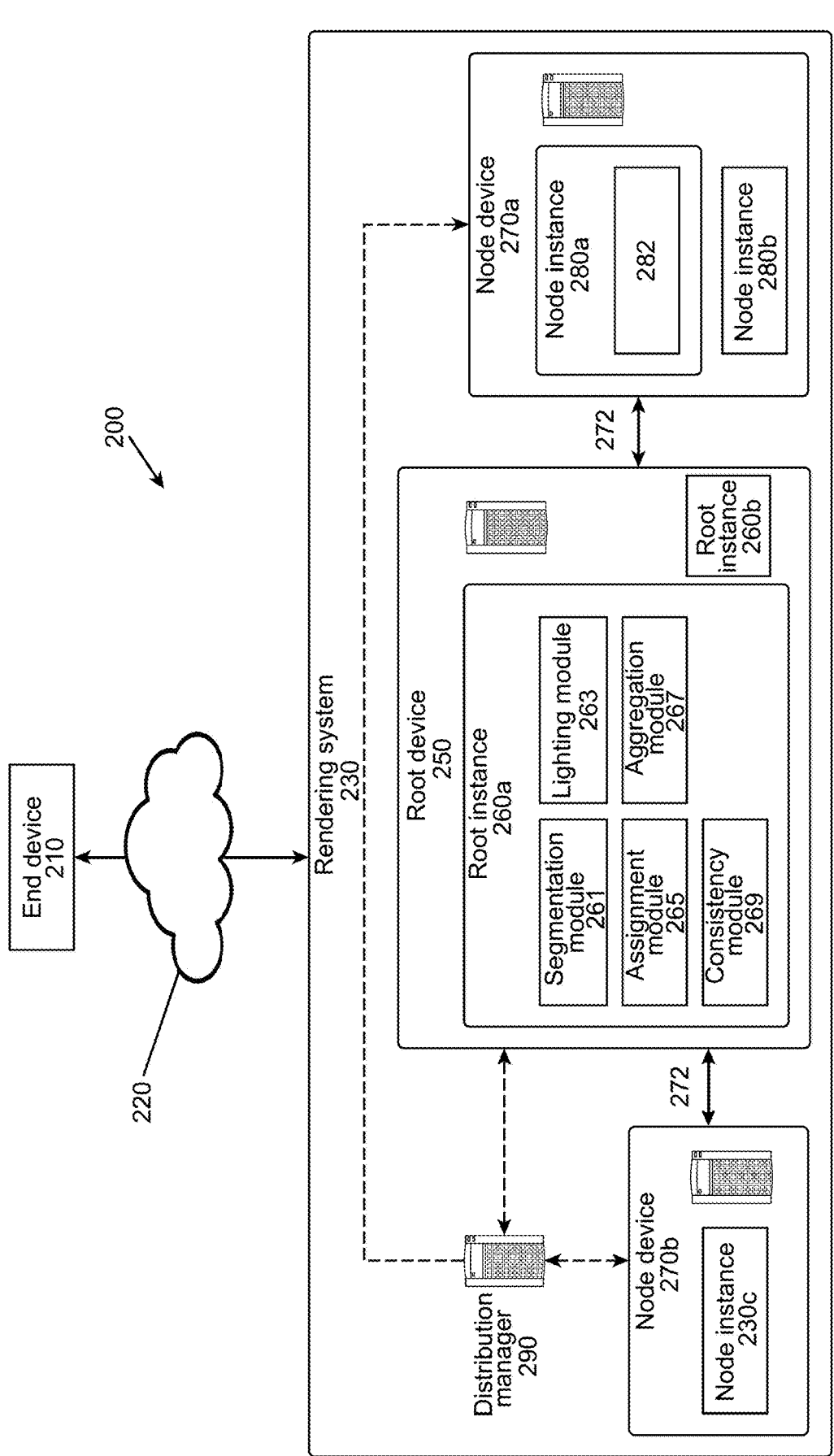
FIG. 1 is a schematic of an environment including a system for distributed real-time rendering of a scene in accordance with an embodiment.

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practised without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

In the present specification, "at least one" means one or more, and "a plurality of" means two or more. The expression "and/or" describes an association relationship of associated objects, and indicates that there may be three relationships. For example, "A and/or B" includes "only A", "both A and B", and "only B", where A and B may be singular or plural. The character "/" generally indicates that the associated objects are in an OR relationship. "At least one of the following items" or a similar expression thereof refers to any combination of these items, including any combination of a single item or a plurality of items. For example, all three of "at least one of a, b, or c", "at least one of a, b, and c" and "at least one of a, b, and/or c" may represent "a", "b", "c", "a and b", "a and c", "b and c", or "a, b and c", where a, b, and c may be a single or multiple form.

In the realm of computer graphics, distributed real-time rendering has emerged as a cutting-edge solution to address the ever-increasing demands for realistic and immersive visual experiences. This approach involves the collaborative efforts of multiple computing resources, often across a network, to collectively render complex scenes in real time. Three key aspects play a pivotal role in enhancing the efficiency and quality of distributed real-time rendering: object partitioning, lighting consistency, and GPU-accelerated rendering.

With reference to FIG. 2, a rendering environment 200 including a rendering system 230 for distributed real-time rendering of scene is shown in accordance with an example embodiment. Broadly described, rendering environment 200 includes one or more end devices 210 connected to a rendering system 230, for instance through the cloud 220. Broadly described, rendering system 230 includes a number of computational devices 250, 270a, 270b, 290 organized for instance as a computer cluster or as a computer grid, configured to manage and run root and node instances 260a, 260b, 280a, 280b, 280c to perform distributed real-time rendering.

The rendering environment 200 includes one or more end devices 210. The devices can include, for instance, one or more mobile phones, one or more portable computers, one or more AR devices and/or one or more VR devices. Each device is equipped with one or more sensors and/or user input means to obtain sensor data and/or user input. As an example, a mobile phone can include one or more positioning sensors including one or more pose sensors such as combined gyroscope(s) and acceleration sensor(s), and/or one or more input means such as a touchscreen configured to receive input data corresponding to positions on the screen being touched. As another example, a portable computer can include input means such as a keyboard, a mouse and/or a touchscreen. As a further example, an AR or VR device can comprise one or more positioning sensors including one or more, e.g., hand-held of head-mounted, pose sensor and/or input means, such as electromagnetic tracking device(s), ultrasonic tracking device(s), magnetometer(s), gyroscope(s) and/or accelerometer(s). Each device 210 can include one or more memory and one or more processors to implement a number of applications which can be benefit from distributed real-time rendering. Additionally, each device 210 can include a display, including for instance one or more monitors, a screen, a head-mounted display such as an optical see-through display or a video see-through display, a handheld display and/or a projector-based display. Advantageously, each device 210 can include a networking device such as a Wi-Fi™ adapter allowing applications to connect to a rendering system to leverage distributed real-time rendering.

As an example, an application can include an immersive VR or AR environment, wherein distributed real-time rendering can be used to provide a highly detailed and dynamic environment, for instance for gaming, training simulation and/or virtual tourism, providing users with incredibly realistic and interactive experiences. Positioning sensors of the device 210 can provide positioning data as input data to the application, including for instance the pose of the device user's head and/or any sensor-acquired data indicative of the gaze direction of the device user, including for instance a roll angle, a pitch angle and/or a yaw angle. In some embodiments, the application receives additional input data, including for instance user inputs. From the input data, a virtual scene that is to be rendered and displayed to the user can be determined, and scene data can be computed therefrom, including for instance information about one or more virtual objects to be displayed, such as transformation matrices and material properties associated with each object. Relevant data such as user input and sensor data, can be sent to a remote rendering system 230 to obtain a rendered scene that can be displayed to the user.

As another example, an application can provide for mixed reality and architectural visualization, for instance allowing architects to use distributed real-time rendering to showcase their designs in a mixed-reality environment. Clients could explore and interact with architectural models in real-time, adjusting lighting and materials to see the impact on the final structure. As a further example, an application can provide high-quality cloud gaming leveraging distributed real-time rendering to offer high-quality, visually stunning games that run smoothly on various devices. Lighting consistency would ensure that the game world looks consistent, enhancing the gaming experience. As yet another example an application can provide for interactive education and training using realistic, cloud-rendered simulations based on distributed real-time rendering. Lighting consistency would be crucial for medical training, engineering simulations, and other fields where visual accuracy is vital. As yet a further example, an application can provide cloud-rendered art and animation to create visually rich and complex artworks and animations without the need for expensive hardware. As yet another example, an application can implement telemedicine and virtual healthcare, wherein distributed real-time rendering providing accurate lighting can facilitate remote surgery, medical training, and patient consultations, enhancing the quality of healthcare services. As yet a further example, an application can provide environmental simulations, allowing researchers and policymakers to leverage distributed real-time rendering to simulate and visualize complex environmental scenarios, helping to better understand and address climate change and conservation efforts. It can be appreciated that other applications are possible and that, in all cases, applications can be configured to receive input data, including for instance positioning data, and to output scene data, corresponding for instance to a virtual scene including one or more virtual objects, for remote rendering by a rendering system 230.

The rendering environment 200 includes network infrastructure 220. The network infrastructure can for instance correspond to the Internet. Each end device 210 is configured to communicate with the rendering system 230 through the network infrastructure 220. For instance, the end device 210 can operate a data stream including scene data, user input data and sensor data towards to the rendering system 230 through network infrastructure 220, and the rendering system can operate a render stream towards the end device 210. In some embodiments, an end device 210 can stream video captured by an imaging sensor to the rendering system 230. In some embodiments, the network infrastructure 220 is configured to allow the rendering system 230 to provide cloud rendering services to end devices 210 through network infrastructure 220. In some embodiments, the network infrastructure 220 is configured to allow the rendering system 230 to provide back-end as a service to end devices 210. Preferably, network infrastructure 220 should allow rapid communications so that all the information received from the user, e.g., user input, or from the sensors, e.g., position data, from an end device 210 is distributed to a corresponding root instance of the rendering system 230 for further synchronization with node instances within a suitably small delay, such as 5 ms.

The rendering environment 200 includes a rendering system 230. The rendering system 230 includes computational devices such as servers connected by networking links and configured to operate for instance as a computational cluster or as a computational grid. The devices can be located in one location or distributed across different locations. The networking links can therefore include a combination of local and wide networks, for instance a number of local area networks connected together in a wide area network, or a number of local area networks connected together through, e.g., the Internet. The devices can have the same or different configurations.

In some embodiments, some or all of the computational devices can have specialized functions. As an example only, the example embodiment shown in FIG. 2 includes at least one root device 250 configured to run root instances 260*a*, 260*b*, a plurality of node devices 270*a*, 270*b*, each configured to run node instances 280*a*, 280*b*, 280*c* (also called render instances), and a distribution manager 290. It can be appreciated that the devices need not be specialized. For instance, in alternative embodiments, a number of devices can be used to run both root and node instances. The rendering system 230 will be described in more detail below with reference to both FIGS. 1 and 2.

The rendering system 230 can include at least one root device 250 configured to run root instances 260*a*, 260*b*. A root instance can for instance correspond to the runtime process of one or more computer programs implementing root instance modules 261-269 as described in more detail below. Broadly described, a root instance can be instantiated, in response to a request from an application of an end device 210 to render a scene. When the root instance receives data from the end device 210 through a network 220, it can perform certain or all tasks of a rendering pipeline. It can additionally instantiate and manage one or more node instances to share the performance of certain tasks of the rendering pipeline.

A root instance 260*a*, 260*b* includes a segmentation module 261 configured to segment and/or clustering the tridimensional scene information into objects and/or object clusters. For each object or object cluster, a rendering task can be defined, corresponding to the object or object cluster, for distribution among node instances.

A root instance 260*a*, 260*b* includes a lighting module 263 configured to compute light parameters and to manage transmitting the light parameters to the node instances. In some embodiments, the lighting parameters can be part of the scene data. The lighting parameters can include any illumination information required to allow a rendering engine to produce a realistic render, including for instance illumination position (e.g., tridimensional coordinates), direction (e.g., tridimensional vector), colour (e.g., RGB 3-tuple), intensity (e.g., integer value measured in lux), shape (e.g., a class such as "cone", "pyramid" or "box"), and/or sampled cube map (e.g., an ordered set of six bidimensional textures). As an example, the lighting parameters can be implemented as a vector of parameters, including for instance three 3-tuples of real numbers corresponding respectively to a position, a direction and a colour. In some embodiments, the lighting parameters can be implemented as a number of light probes. As an example, a light probe can be represented as a set of spherical harmonics basis functions and can be implemented as a vector of a suitable number of function coefficients, for instance nine per colour channel. In some embodiments, the lighting parameters can be inferred, e.g., by photometric registration, from the scene data. In some embodiments, the rendering system 230 received a video stream captured by an imaging sensor of the end device 210 and the lighting module 263 can be configured to infer the lighting parameters, e.g., by photometric registration, from the video stream. In some embodiments, a combination of some or all of the approaches defined above is used.

A root instance 260*a*, 260*b* includes an assignment module 265 configured to assign the rendering tasks to node instances of node devices in such a way as to balance their load. In some embodiments, load balancing is achieved by computing a workload associated with rendering the virtual objects included in each rendering task. As an example, if a scene is segmented into one complex rendering task, i.e., a task corresponding to an object or an object cluster that will require relatively more computational resources to render, and two simpler rendering tasks, i.e., tasks corresponding to objects or object clusters that will each require relatively less computational resources to render, the complex task can be assigned to a first node device and the two simpler tasks can be assigned to a second node device. In some embodiments, complex objects can be split into smaller sub-objects, each associated with a rendering task, to ensure more uniform task distribution and/or faster rendering through additional parallelization. In some embodiments, if the root device has remaining computational capacity, it can assign some or all of the rendering tasks to node instances running on the root device. In some embodiments, load balancing is based on a workload measure determined, e.g., for each object, object cluster and/or rendering task. Any suitable workload measure, alone or in combination with other workload measures, can be used. As an example, a count of the number of polygons to be rendered can correspond to a workload measure. Additionally or alternatively, the total texture size of an object can be used to determine the workload measure. In some embodiments, scenes are dynamic and information used to determine a workload measure can change throughout the rendering of a scene, therefore workload evaluation can also be dynamic, i.e., updating the workload measures as the scene data changes. In some embodiments, load balancing can be performed by manually allocating computing resources for rendering tasks.

Figure 3:
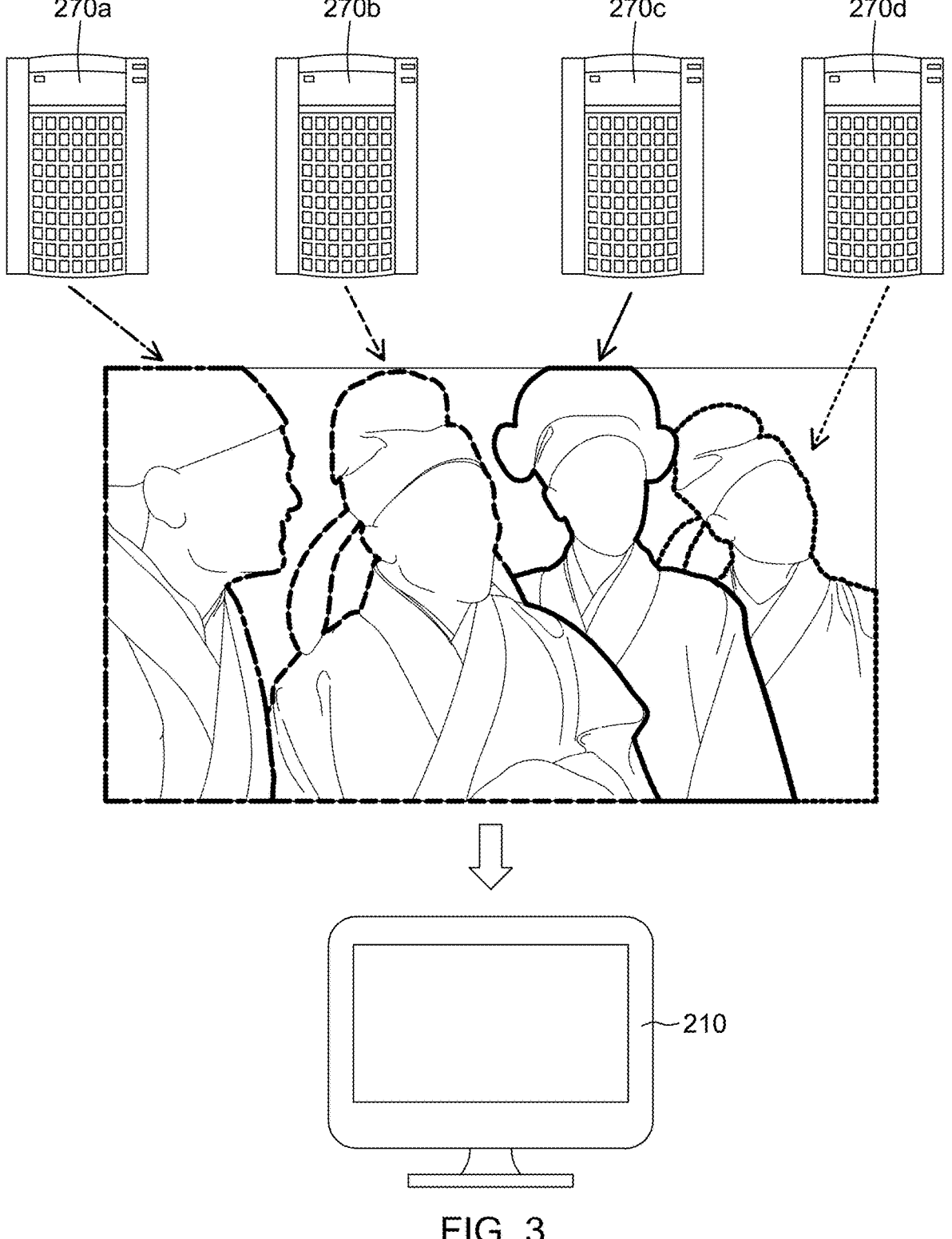
FIG. 3 is partial schematic of an environment including a system for distributed real-time rendering of a scene in accordance with an embodiment.

A root instance 260*a*, 260*b* includes an aggregation module 267 configured to create a rendered scene from the objects or clusters of objects rendered by the node instances. In some embodiments, buffer rendering is used, for instance by using a distributed image buffering technique, to perform the aggregation of rendered objects. As an example, the rendered objects or object clusters can each be rendered in a geometric buffer, which are merged by the aggregation module 267. FIG. 3 shows an example wherein a rendered scene is aggregated from four objects each rendered by one of node instances 270*a*-*d* before being sent to end device 210 for display.

With reference to FIG. 1, a root instance 260*a*, 260*b* can include a consistency module 269 configured to periodically perform consistency checks to identify and correct rendering artifacts or discrepancies between objects.

The rendering system 230 can include at least one node device, and preferably a plurality of node devices 270*a*, 270*b* configured to run node instances 280*a*, 280*b*, 280*c*. Each node device 270*a*, 270*b* is connected to at least one root device 250 through a link 272. Each node instance 280*a*, 280*b*, 280*c* implements at least one module. It can be appreciated that, while FIG. 1 illustrates two node devices 270*a*, 270*b* and three node instances 280*a*, 280*b*, 280*c*, the rendering system 230 can include a plurality of node devices, for instance more than one hundred node devices, each capable of running one or a plurality of node instances.

The rendering system 230 includes links 272 allowing for communication between a root instance and node instances managed by the root instance. Links 272 can for instance implement inter-process communication techniques such as remote procedure calls or message queues. Links 272 are used to transmit rendering task-related information such as object metadata and lighting parameters from a root instance to a node instance, and to transmit rendering task work products such as point clouds and u, v maps from a node instance to a root instance. In some embodiments, links 272 can be used by node instances to transmit intermediate results to assist the root instance in enforcing consistency. In some embodiments, links 272 are additionally used to transmit user input and/or sensor data received by a root instance from an end device 210 to a node instance. Camera synchronization is the key to keeping the final illumination information consistent between the root instance and the node instances. All the information received from the end device 210 should therefore preferably be rapidly distributed to the relevant node instance through the root instance, and then applied to the relevant distributed object. As an example, if the end device moves, a walking animation can be played, changing the camera view. The synchronization frequency of the input information can be determined by the application and/or the end device user.

A node instance 280*a*, 280*b*, 280*c* includes a rendering module 282 configured to render the object(s) associated with the rendering task(s) it is assigned, for instance by applying physic-based rendering or hybrid rendering. The result of the rendering of an object or an object cluster includes a point cloud. In some embodiments, the point cloud is computed by raycasting. To create a point cloud, the virtual camera emits several rays within the view angle. When a ray hits the geometry, the contact position can be obtained by the ray. The point cloud can therefore be obtained by combining the detection results of all the rays along the horizontal and vertical axes. In some embodiments, the sampling density is determined by the distance between the camera and the distributed object to determine the required level of detail. As an example, if the distance is small, a high density is required to avoid distortion, and the sample point must contain material information to restore the correct material. In some embodiments, the point cloud is a vector of points, each point having tridimensional coordinates associated with a coordinate system, for instance a scene coordinate system having the virtual scene as a frame of reference or a world coordinate system having the real world as a frame of reference, each point being further associated with a texture and/or a colour. In some embodiments, the result of the rendering of an object or an object cluster further includes an u, v map, in order to stream simplified geometric information. The u, v map is can correspond to a simplified bidimensional representation of the tridimensional object(s) along two axes u and v, for instance in a map projection frame of reference, in which all vertices encode colour information. In some embodiments, the aggregation module 267 is configured to cast shadows into the rendered scene using the u, v maps returned by each node instance.

In some embodiments, the rendering system 230 includes at least one distribution manager 290. The distribution manager 290 is configured to accept requests from the end devices 210 and then determines which server, e.g., which root device 250, has enough resources to launch the real-time rendering instance. Each server has a distribution instance that monitors resources in real time. After a root instance is started as the result of a request, node instances are automatically started as required. In some embodiments, the distribution manager 290 can monitor the available processing capacity of node devices and can be used by the assignment module 265 to determine assignments based on computed workload and available processing capacity.

With reference to FIG. 1, a method 100 for distributed real-time rendering of a scene is shown in accordance with an example embodiment. Broadly described, data is received 105 at a root instance and a corresponding scene is segmented 115. Segments are assigned to one or more node instances 125 for rendering 135. The individual renders are then aggregated 145.

In an initial step, a root instance 260 receives data 105, for instance from an end device 210, including for instance sensor data and user input. From the received data, a scene to be rendered is determined. The scene can be a virtual tridimensional scene including virtual objects. Scene information can include scene data and/or information, such as information on virtual objects, e.g., their tridimensional position and pose information such as rotation(s) and scaling (s).

Upon determining scene information at step 105 or after having segmented the scene at step 115, the root instance 260 can compute a workload associated with rendering the scene and/or one or more objects included in the scene and with computing the geometrical deformations of objects in a subsequent step 110. The process of measuring the computation workload can be done by empirical models or by measurement. As an example, it is known that digital human-related calculations, such as skin, hair, clothes rendering and simulation, are generally resource-consuming. High-fidelity animations, for instance of faces, are also resource-intensive, especially when tens or hundreds of thousands of polygons are used. As a matter of fact, it can be appreciated that hundreds of thousands of polygons are required to obtain at least an initial level of high realism. Through an empirical model, it is therefore possible to estimate a computation workload associated with rendering an object based on factors such as the number of polygons and the quality of skin and hair details. The workload can additionally or alternatively be determined automatically by measuring key attributes. The computational workload computed for a scene and/or objects included in the scene can be compared to the computational resources available on a device implementing the root instance, for instance to the GPU capabilities of the device, in order to determine whether the scene and/or object can be rendered locally or should be assigned to a node instance by following the subsequent steps of method 100 to implement distributed rendering. It can be appreciated that the computational workload increases as the desired degree of realism increases, which can be different between different virtual objects included in a scene. Therefore, object with high realism requirements are more likely to be assigned for distributed rendering.

Before, after, or concurrently with performing step 110, method 100 can include a segmentation step 115 including segmenting and/or clustering the tridimensional scene information into objects and/or object clusters. Segmentation, or partitioning, entails breaking down a complex scene into manageable segments for distributed rendering across multiple node instances. A significant challenge lies in achieving optimal load balancing while preserving the integrity of the scene's visual coherence. A segmentation strategy should be efficient by taking a balanced consideration of various workloads and existing computing resources, avoiding the computing delays and communication overheads caused by uneven and over-fined partitions. Segmentation can be performed based on any suitable criterion or combination of criteria, such as for instance the object geometry, the object material properties, and the scene hierarchy. For each object and/or object cluster, a discrete rendering task can be instantiated to correspond with the object(s). Based on a workload measurement obtained at step 110 for the object(s) associated with a rendering task, it can be determined whether the rendering task is to be assigned to a remote node instance, or can be performed locally. It can be appreciated that, depending on the embodiment and on the actual scene information, no rendering task, a subset of the rendering tasks, or all the rendering tasks can be distributed for remote performance.

Before, after, or concurrently with performing steps 110 and/or 115, method 100 includes computing lighting parameters associated with the scene in step 120. Lighting parameters include any illumination information required to allow a rendering engine to produce a realistic render, including for instance illumination position (e.g., tridimensional coordinates), direction (e.g., tridimensional vector), colour (e.g., RGB 3-tuple), intensity (e.g., integer value measured in lux), shape (e.g., a class such as "cone", "pyramid" or "box"), and/or sampled cube map (e.g., an ordered set of six bidimensional textures). This step has to be performed once, e.g., for static illumination, before rendering can commence in node instances. In some embodiments, the scene can include dynamic illumination, such that certain or all lighting parameters can be modified during rendering. When dynamic illumination is included in a scene, lighting parameters can be computed and synchronized with node instances at suitable frequency, for instance 30 Hz or more, to implement real-time adjustment of light changes. In some embodiments, a global illumination model is used. In some embodiments, some or all of the illumination information can be based on probes, including for instance one or a combination of one or more light probes such as global illumination probes and/or of one or more reflection probes. The probes can be active probes, passive probes, or a combination of active and passive probes. For instance, probes can be used to cache light sampled at various points in the environment. It can be appreciated that probes can be used to cache a large quantity of lighting information. In some embodiments, the resolution and/or synchronization frequency associated a large quantity of dynamic lighting information can be decreased to lower suitable values, for instance a resolution of 512×512 or less and/or a synchronization rate of 5 Hz or less.

When it was determined, for instance at step 110, that distributed rendering is desirable, a subsequent step 125 includes assigning/distributing the rendering tasks to one or more node instances 280 for concurrent, parallel processing. In some embodiments, the distribution of rendering tasks between node instances and/or node devices is based on the complexity of the object(s) included in each task, as determined for instance by the computation workload computed at step 110, to achieve load balancing. In some embodiments, the root instance can implement a centralized rendering queue, for instance as a priority queue, to manage the order and the priority of rendering tasks, for instance when there are dependencies between objects. In some embodiment, the scene can be dynamic, e.g., virtual objects can appear or disappear, or the virtual objects can change, and the root instance can dynamically allocate or de-allocate render nodes based on workload to handle varying rendering demands efficiently. In some embodiments, to ensure reliability and implement fault tolerance, redundant node devices can be employed, and tasks can be automatically reassigned in case of node failures.

Upon assigning a rendering task to a node instance 280, information such as metadata of objects associated with the rendering task and the lighting parameters are communicated from the root instance 260 to the node instance 280 in step 130. The object metadata can include, for instance, transformation matrices, material properties, and visibility information. They can be stored centrally by the root instance 260 and synchronized across all node instances 280 to ensure consistent rendering. As explained above, when calculating indirect lighting, the root instance shares precomputed lighting parameters to ensure consistent light, and can also periodically synchronize computed lighting parameters to node instances to implement dynamic lighting, e.g., dynamic reflection and global illumination. In some embodiments, to achieve lighting consistency across objects and clusters, global illumination algorithms such as Dynamic Diffuse Global Illumination can be employed. These methods consider indirect lighting interactions between objects. Consistent lighting requires simulating the transport of light across objects, which involves accurate handling of reflections, refractions, and shadows. In some embodiments, information on global illumination and reflection of scene is adaptively streamed to the relevant node instances based on the object(s) associated with the rendering task(s) they are handling. As an example, prior to assignment, objects in the root instance are able to detect global illumination and reflection probes around themselves, such that only the detected probes detected by an object can be streamed to the node instances associated with the object. In some embodiments, changes to the scene, such as object transformations, material updates, or dynamic objects, are also communicated to all node instances in real time to maintain consistency.

In a subsequent step 135, each node instance 280 independently processes the objects or object clusters associated with their assigned rendering tasks, for instance concurrently. As examples, techniques like physic-based rendering or hybrid rendering can be used, depending on the rendering pipeline. For instance, when a tridimensional model is listed as an object included in a distributed rendering task, the node instance can be instructed to load associated resources such as geometry, textures, and materials to the memory. In the node instance 280, a virtual camera can continuously sample distributed objects, for instance based on user input transmitted by the root instance. The sampling result is the calculation result, which can be represented by a point cloud and/or a streamed u, v map.

In other words, the node instances are responsible for receiving the input stream and synchronizing virtual cameras at runtime. Streamed data includes user inputs from an end device. As examples, in the case of mobile phones, input data could include touch positions on the screen, in the case of portable computers, they could include mouse or keyboard inputs, and in the case of augmented reality (AR) or virtual reality (VR) devices, they could include head or hand positions and poses. The node instances are responsible for geometry deforming and material rendering. In some embodiments, the node instances play skeleton animations, e.g., based on the user's input. The node instances receive information on reflection and global illumination from the root instance, then calculates reflection and lighting on distributed objects. Virtual cameras in node instances adaptively sample render results into a geometry streaming module, e.g., by point cloud streaming and/or u, v map streaming. In some embodiments, camera sampling quality is adaptively adjusted by the distance between the virtual camera and distributed objects, thereby implementing a level-of-detail feature. In some embodiments, a camera sample is also adjusted based on the geometry inside and/or outside of the camera. As examples, if the geometry is inside the camera, it can be sampled in the highest density, whereas if the geometry is outside of the camera, it can be sampled in lowest density. The lowest density can be used by the root instance for shadow rendering. In some embodiments, based on the static and/or dynamic lighting parameters received by the node instances, the material final result can be calculated using a lighting model assigned to the material. In some embodiments, this calculation is based on physically based rendering.

Upon completing a rendering task, e.g., when the rendering and the simulation calculation are complete, the node instance 280 transmits the result to the root instance 260 in step 140. In some embodiments, the calculation results returned from the node instances 280 are represented in geometry through point clouds and/or streamed u, v maps.

When the root instance 260 has received the results of each rendering task, a subsequent step 145 includes aggregating the received results to create a final rendered scene, e.g., for real-time display. In some embodiments, step 145 can start when the root instance 260 has received the result of a predetermined number or proportion of the rendering tasks and progress as more results are received. In some embodiments, step 145 include lighting consistency management, aiming to maintain uniform and coherent lighting effects within a rendered scene for creating realistic and visually appealing virtual environments. A lighting consistency manager can be responsible for rendered results aggregation and lighting consistency management, ensuring that the composed scene's lighting effects align seamlessly, creating a cohesive visual result. In the root instance, after receiving the point cloud information corresponding to an object, the corresponding position can be displayed in the scene, because the position and rotation of the camera in the scene and the camera in the node instance are completely synchronized. Therefore, the graph sampled by the camera in the node instance and the graph to be displayed in the root instance can completely overlap. In this way, the compute workload in the root instance is transferred to the node instance.

In some embodiments, in step 150, a streamed u, v map is also built into the original geometry by the root instance 260 so that it can be used as a reference when rendering shadows. The shadow calculation can adopt known methods. As an example, a shadow map can be created to ensure that the objects can cast shadows on the environment. In some embodiments, when restoring an object, a determination is made as to whether the material adopts the configuration of accepting shadows, to ensure that the object can accept shadows. In some embodiments, the root instance renders shadows based on the low-density/resolution geometries streamed from node instances. In some embodiments, distributed object can also receive shadow from other object, whether the other object is a distributed object or not. This shadow can overlap with the geometry reconstructed using a point cloud and/or an u, v map.

In some embodiments, an additional step 155 includes periodically performing consistency checks to identify and correct rendering artifacts or discrepancies between objects.

Finally, in step 160, the root instance 260 can compress video frames from GPU buffers and/or stream them to an end device 210.

Figure 4:
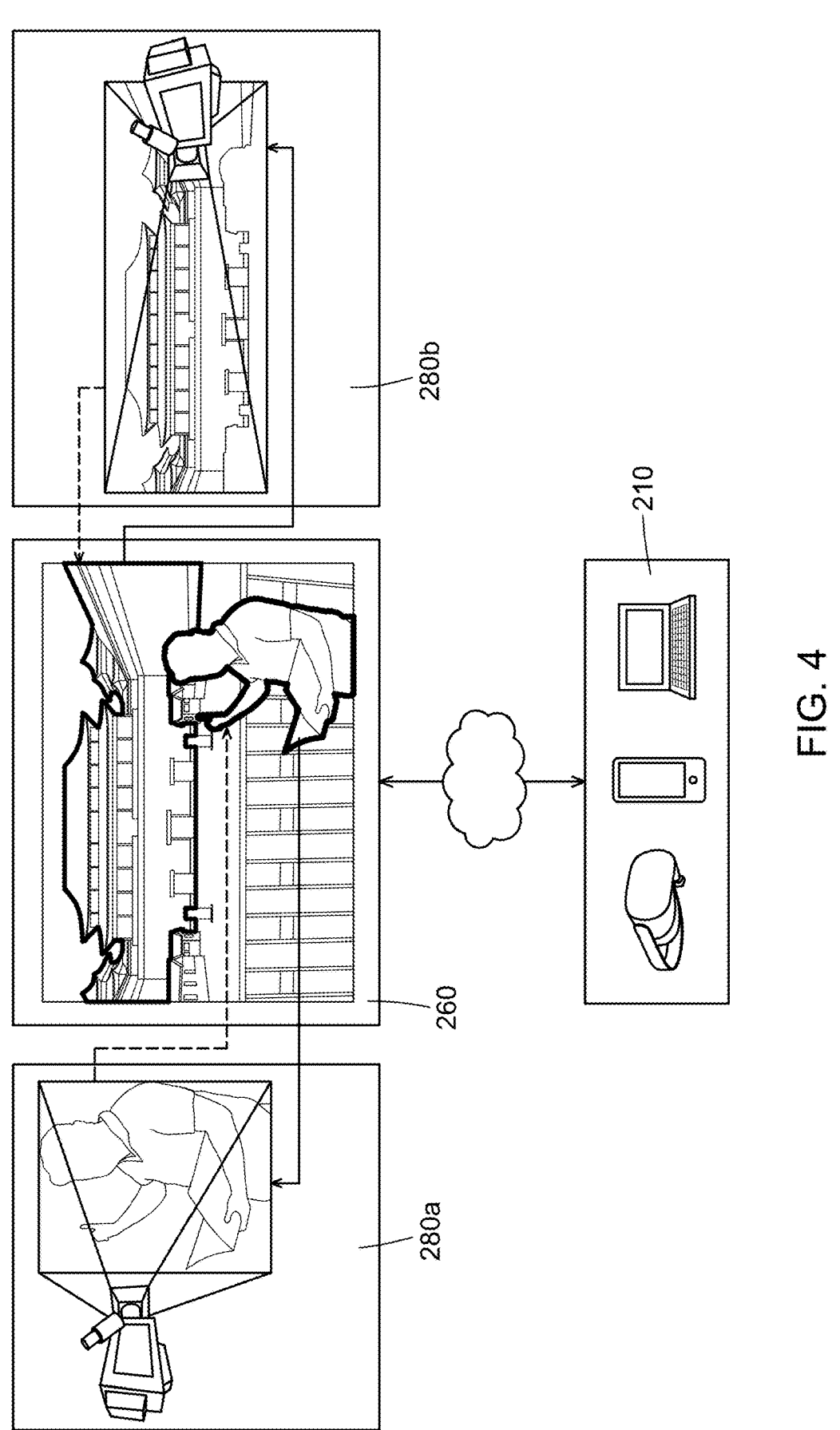
FIG. 4 is partial schematic of an environment including a system for distributed real-time rendering of a scene in accordance with an embodiment.

With reference to FIG. 4, an environment including a system for distributed real-time rendering of a scene is partially shown, in accordance with an embodiment. Broadly described, an end device 210 is configured to transmit data, including sensor data and/or user input to a render root 260, corresponding to a root instance. The render root 260 includes modules, for instance software modules, configured to gather lighting and reflection information and synchronize this information along with user input with a number of render nodes 280a, 280b, each corresponding to a node instance. The render root 260 is also configured to segment and/or partition scene data into a number of objects or object clusters, to assign the rendering of each object or object cluster to a render node. As an example, the scene data can specify the properties of a first virtual object corresponding to a person and a second virtual object corresponding to a building that is to be rendered behind the first virtual object, and the render root 260 can assign the rendering of the first object to render node 280a and the rendering of the second object to render node 280b. The render nodes 280a, 280b can render their assigned objects using modules, for instance software modules, configured to reconstruct a light environment and reflections, to synchronize the light environment, reflections and user input with the render root 260, and to render the object through camera sampling. The render root 260 can further include modules configured to reconstruct a low and/or a high quality geometry from the renderings of the render nodes 280a, 280b, to cast shadows, and to transmit the resulting video stream to the end device 210 for display.

Figure 5:
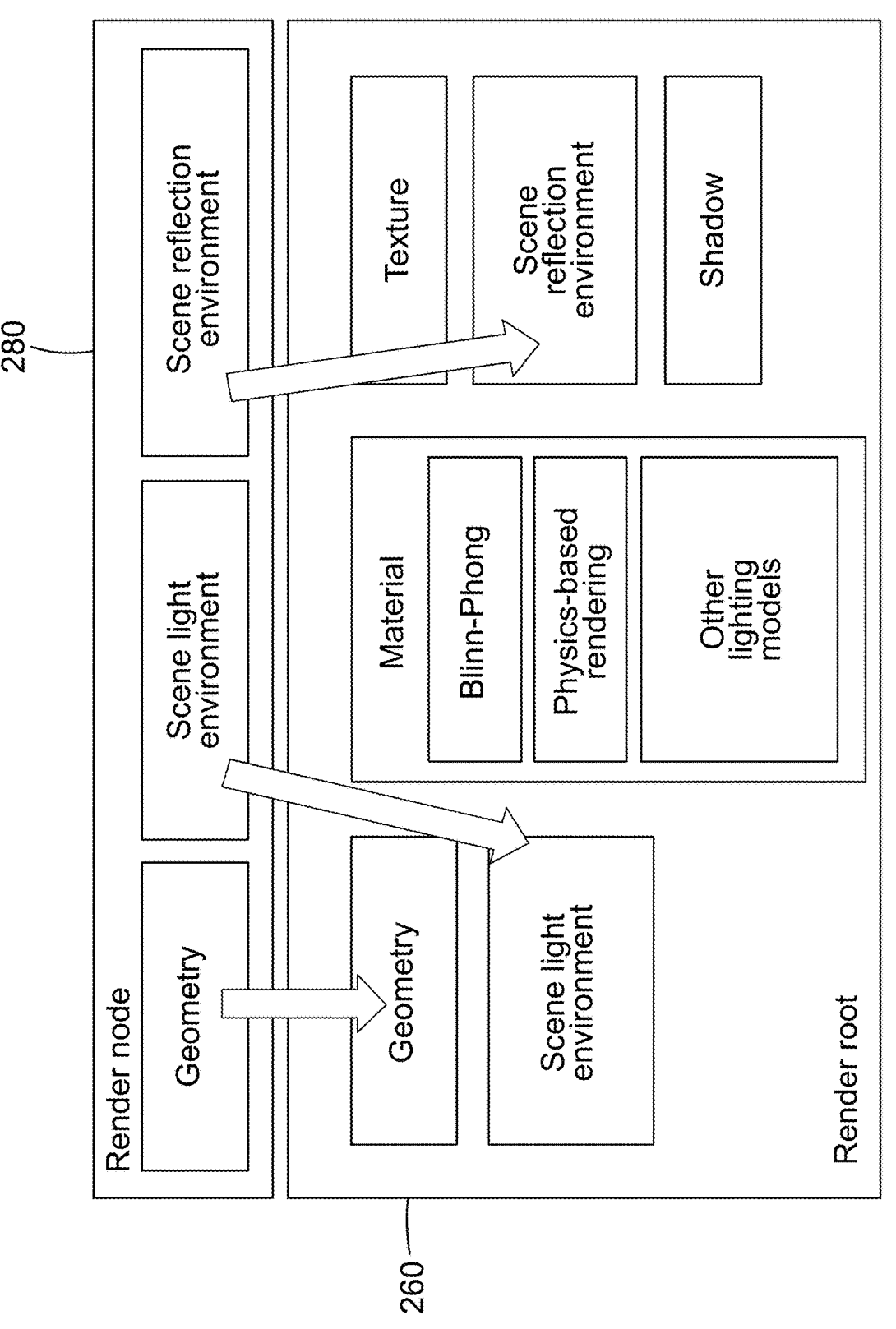
FIG. 5 is schematic of a system for distributed real-time rendering of a scene in accordance with an embodiment.

With reference to FIG. 5, an environment including a system for distributed real-time rendering of a scene is partially shown, in accordance with an embodiment. Broadly described, a render root 260, corresponding to a root instance, and a render node 280, corresponding to a render instance, includes modules, for instance software modules, configured to compute and synchronize a scene geometry, a scene lighting environment and a scene reflection environment. The render node 280 can implement one or a number of rendering models to allow for texture and shadow computations, such as a Blinn-Phong reflection model, a physically based rendering model, and/or one or more other lighting models.

Object-based partitioning applied to cloud rendering is a novel approach to leverage the computational capabilities of GPUs for real-time high-quality rendering. It divides the rendering workload into smaller, manageable objects or clusters for load balancing, and has the advantage of allowing multiple objects to be processed in parallel, significantly reducing rendering times, and breaking GPU capacity limitation on one single machine. It is therefore scalable, as it can adapt to varying rendering demands and provide the flexibility to handle large scenes.

Lighting consistency applied to cloud rendering is a novel approach for achieving realism and visual quality in distributed rendering systems. Although applying lighting consistency efficiently in cloud rendering requires advanced computing techniques such as sharing lighting data, managing communication between node instances and ensuring that all objects in the scene receive consistent lighting calculations, it allows to maintain consistent lighting across a tridimensional scene and thereby enhances the visual quality and realistic visuals of rendered images.

The embodiments disclosed herein therefore offer a novel approach to achieve parallel, real-time, high-quality rendering, which is something that neither render farms, nor traditional monolithic systems can achieve. The present disclosure enables parallel, real-time and high-quality visual effects with the embedded mechanisms of object-based partitioning and lighting consistency.

One or more steps and/or modules described herein may be implemented in computer program(s) executed on processing device(s), each comprising at least one processor, a data storage system (including volatile and/or non-volatile memory and/or storage elements), and optionally at least one input and/or output device. "Processing devices" encompass computers, servers and/or specialized electronic devices which receive, process and/or transmit data. As an example, "processing devices" can include processing means, such as microcontrollers, microprocessors, and/or CPUs, or be implemented on FPGAs. For example, and without limitation, a processing device may be a programmable logic unit, a mainframe computer, a server, a personal computer, a cloud-based program or system, a laptop, a personal data assistant, a cellular telephone, a smartphone, a wearable device, a tablet, a video game console or a portable video game device.

Each program is preferably implemented in a high-level programming and/or scripting language, for instance an imperative e.g., procedural or object-oriented, or a declarative e.g., functional or logic, language, to communicate with a computer system. However, a program can be implemented in assembly or machine language if desired. In any case, the language may be a compiled or an interpreted language. Each such computer program is preferably stored on a storage media or a device readable by a general or special purpose programmable computer for configuring and operating the computer when the storage media or device is read by the computer to perform the procedures described herein. In some embodiments, the system may be embedded within an operating system running on the programmable computer.

Furthermore, the system, processes and methods of the described embodiments are capable of being distributed in a computer program product comprising a computer readable medium that bears computer-usable instructions for one or more processors. The computer-usable instructions may also be in various forms including compiled and non-compiled code.

The processor(s) are used in combination with storage medium, also referred to as "memory" or "storage means". Storage medium can store instructions, algorithms, rules and/or trading data to be processed. Storage medium encompasses volatile or non-volatile/persistent memory, such as registers, cache, RAM, flash memory, ROM, diskettes, compact disks, tapes, chips, as examples only. The type of memory is, of course, chosen according to the desired use, whether it should retain instructions, or temporarily store, retain or update data.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A method for distributed real-time rendering of a scene, the method comprising:

segmenting, by a root instance, the scene into a plurality of objects, each object of the plurality of objects associated with respective object metadata including respective at least one of transformation matrices, material properties, or visibility information;

computing, by the root instance, lighting parameters associated with the scene;

assigning to each node of a plurality of node instances one or more of a plurality of rendering tasks, each rendering task of the plurality of rendering tasks being associated with respective one or more objects of the plurality of objects;

with respect to each rendering task, communicating, from the root instance to a corresponding assigned node instance, the respective object metadata and the lighting parameters;

with respect to each rendering task, rendering, by the corresponding assigned node instance, the respective one or more objects into at least a respective point cloud based on the respective object metadata and the lighting parameters, the rendering the respective one or more objects into at least the respective point cloud comprising:

rendering, by the corresponding assigned node instance, the respective one or more objects into at least the respective point cloud including a sampling density determined by distances between a virtual camera and the respective one or more objects based on the respective object metadata and the lighting parameters, wherein the respective object metadata includes the transformation matrices, the material properties, and the visibility information;

with respect to each rendering task, sending the respective point cloud from the corresponding assigned node instance to the root instance; and rendering, by the root instance, a rendered scene from respective point clouds for real-time display.

2. The method of claim 1, further comprising:

obtaining position data from at least one positioning sensor of an end device or user input from at least one input apparatus of the end device;

transmitting at least one of the position data or the user input to the root instance for the distributed real-time rendering of the scene;

receiving the rendered scene from the root instance; and displaying the rendered scene on a display of the end device.

3. The method of claim 1, wherein the rendering the respective one or more objects comprises rendering the respective one or more objects into a u, v map based on the respective object metadata and on the lighting parameters, the method further comprising:

casting or receiving, by the root instance from the plurality of node instances, one or more shadows in the rendered scene based on u, v maps.

4. The method of claim 1, wherein scene lighting is dynamic, the method further comprising:

periodically computing and sending, by the root instance, to the plurality of node instances the lighting parameters.

5. The method of claim 1, wherein the lighting parameters are computed based on a plurality of probes comprising at least one of a light probe or a reflection probe.

6. The method of claim 5, wherein the communicating the lighting parameters comprises:

transmitting only a subset of the lighting parameters associated with a subset of the plurality of probes that are relevant to the corresponding assigned node instance.

7. The method of claim 1, further comprising:

performing, by the root instance and the plurality of node instances, dynamic diffuse global illumination.

8. The method of claim 1, wherein the scene is dynamic, further comprising synchronizing, by the root instance, object metadata across the plurality of node instances periodically.

9. The method of claim 1, further comprising:

determining a workload measure associated with rendering the respective one or more objects, wherein the segmenting the scene is performed in response to the workload measure being above a workload threshold.

10. The method of claim 9, wherein the scene is dynamic, the method further comprising:

dynamically allocating or de-allocating, by the root instance, a subset of the plurality of node instances based on changes in the workload measure.

11. A system for distributed real-time rendering of a scene, the system comprising:

a root instance; and a plurality of node instances, wherein the root instance is configured to perform:

segmenting the scene into a plurality of objects, each object of the plurality of objects associated with respective object metadata including respective at least one of transformation matrices, material properties, or visibility information;

computing lighting parameters associated with the scene;

assigning to each node of the plurality of node instances one or more of a plurality of rendering tasks, each rendering task of the plurality of rendering tasks being associated with respective one or more objects of the plurality of objects; and with respect to each rendering task, communicating to a corresponding assigned node instance, the respective object metadata and the lighting parameters;

wherein the plurality of node instances are configured to perform:

with respect to each rendering task, rendering, by the corresponding assigned node instance, the respective one or more objects into at least a respective point cloud based on the respective object metadata and the lighting parameters, the rendering the respective one or more objects into at least the respective point cloud comprising:

rendering, by the corresponding assigned node instance, the respective one or more objects into at least the respective point cloud including a sampling density determined by distances between a virtual camera and the respective one or more objects based on the respective object metadata and the lighting parameters, wherein the respective object metadata includes the transformation matrices, the material properties, and the visibility information; and with respect to each rendering task, sending the respective point cloud from the corresponding assigned node instance to the root instance; and wherein the root instance is further configured to perform:

rendering a rendered scene from respective point clouds for real-time display.

12. The system of claim 11, further comprising:

an end device comprising:

at least one processor, configured to run an immersive application;

at least one position sensor configured to generate position data or at least one input apparatus configured to receive user input while the immersive application is running;

at least one transceiver, configured to transmit the position data or the user input to the root instance for the distributed real-time rendering of the scene and to receive the rendered scene from the root instance; and at least one display configured to display the rendered scene.

13. The system of claim 11, wherein the rendering the respective one or more objects comprises rendering the respective one or more objects into a u, v map based on the respective object metadata and on the lighting parameters, the root instance further configured to perform:

casting or receiving, by the root instance from the plurality of node instances, one or more shadows in the rendered scene based on u, v maps.

14. The system of claim 11, wherein scene lighting is dynamic, and wherein the root instance is further configured to perform:

periodically computing and sending to the plurality of node instances the lighting parameters.

15. The system of claim 11, wherein the lighting parameters are computed based on a plurality of probes comprising at least one of a light probe or a reflection probe.

16. The system of claim 15, wherein the communicating the lighting parameters comprises:

transmitting only a subset of the lighting parameters associated with a subset of the plurality of probes that are relevant to the corresponding assigned node instance.

17. The system of claim 11, wherein the root instance and the plurality of node instances implement dynamic diffuse global illumination.

18. The system of claim 11, wherein the scene is dynamic, and wherein the root instance is configured to perform transmitting object metadata across the plurality of node instances periodically.

19. The system of claim 11, wherein the root instance is further configured to perform:

determining a workload measure associated with rendering the respective one or more objects, wherein the segmenting the scene is performed in response to the workload measure being above a workload threshold.

20. The system of claim 19, wherein the scene is dynamic, and wherein the root instance is further configured to perform:

dynamically allocating or de-allocating a subset of the plurality of node instances based on changes in the workload measure.

\* \* \* \* \*